Nov. 30, 1954  N. G. NAZARENKO  2,695,521

TEMPERATURE RESPONSIVE MEASURING INSTRUMENT

Filed Aug. 26, 1950  2 Sheets-Sheet 1

INVENTOR.
NICHOLAS G. NAZARENKO
BY
ATTORNEYS

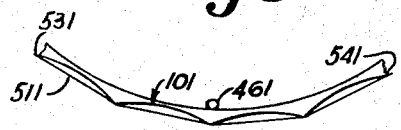
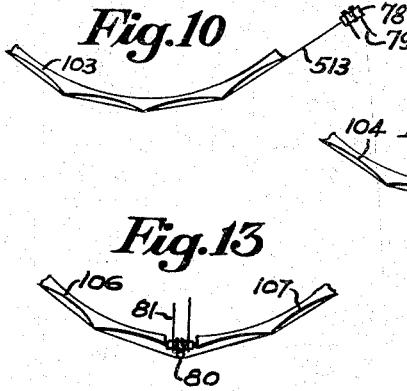
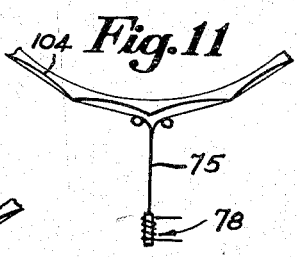
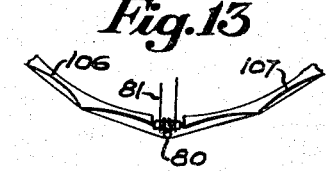
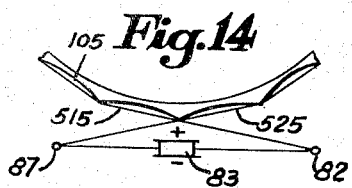
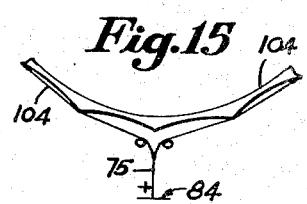
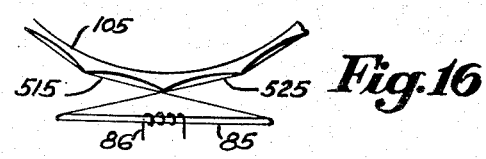

United States Patent Office

2,695,521
Patented Nov. 30, 1954

2,695,521

TEMPERATURE RESPONSIVE MEASURING INSTRUMENT

Nicholas G. Nazarenko, Keansburg, N. J.

Application August 26, 1950, Serial No. 181,653

5 Claims. (Cl. 73—363)

This invention relates to measuring instruments and devices.

An object of the present invention is the provision of extremely sensitive and precisely operating measuring instruments and other devices which are constructed on the basis of novel specific principles making them most suitable for various fields of science and engineering.

Another object is the provision of instruments which are most effective for the measuring of heat, movement, electricity and magnetism including the measurement of various heated bodies, automatically operating installations, non-freezing thermometers for low temperatures, thermometers for average and normal temperatures, radiational, convectional and distance thermometers for measuring high temperatures, measuring the speed of flow of gases and liquids, measuring the speed of movement of various bodies in gaseous and liquid media, measuring direct and alternating current and voltage, including magnetic, electromagnetic and heat operated amperemeters, milliamperemeters, voltmeters and galvanometers, etc., measurement of static charges, including electrostatic electrometers, electrostictional devices etc., measurement of magnetic forces, including magnetostrictional magnetometers, and other magnetometers.

Other objects of the present invention will become apparent in the course of the following specification.

In accomplishing the objects of the present invention it was found desirable to use a wire the expansion or contraction of which is utilized for measuring purposes, to tension a spring having essentially the shape of a portion of a multi-sided polygon or that of a semi-circle and connected to an indicator movable over a scale; the spring consists of a plurality of alternating elastic and rigid sections.

Thus the construction of the present invention is based, firstly, upon the principle that the central portion of a resilient plate will be raised to an extent which is twenty times the path of a free end of said plate, the other end being fixed, provided that the path of the plate center is less than 1/500 of the length of the plate and secondly, that if one end and the middle portion of an expansible wire are attached, respectively, to the fixed end and the center portion of a rigid plate, the path of movement of the other free end of the plate will be twice as great as the path of the middle portion of an equivalent wire clamped at both ends.

The invention will appear more clearly from the following detailed description when taken in connection with the accompanying drawings showing, by way of example, preferred embodiments of the inventive idea.

In the drawings:

Figures 3 to 7 are diagrams illustrating possible modifications of the inventive idea.

Figures 8 to 17 are diagrams illustrating possible applications of instruments constructed in accordance with the present invention.

Figure 1:
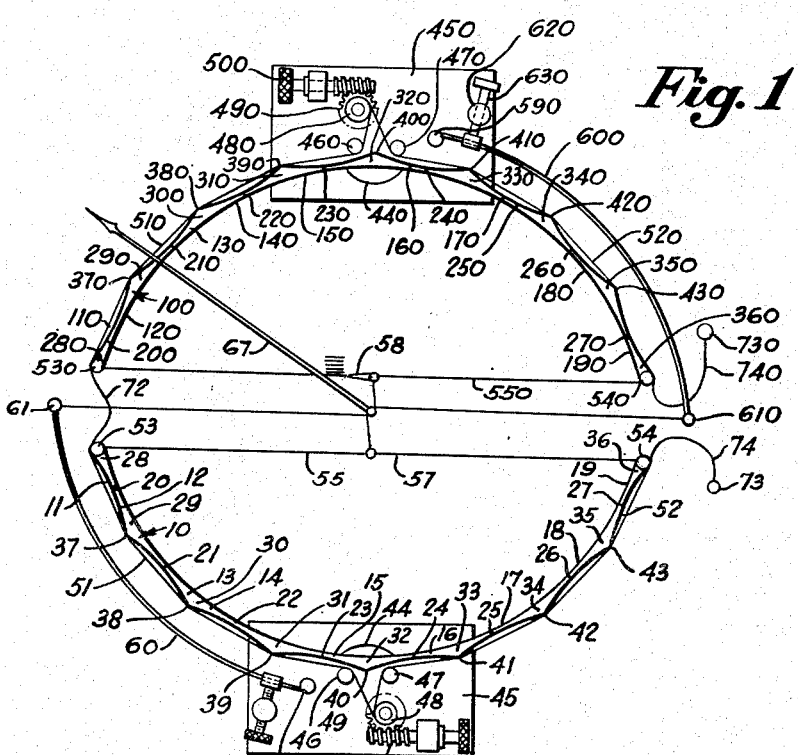
Figure 1 is a top view of an instrument constructed in accordance with the principles of the present invention.
Figure 2:
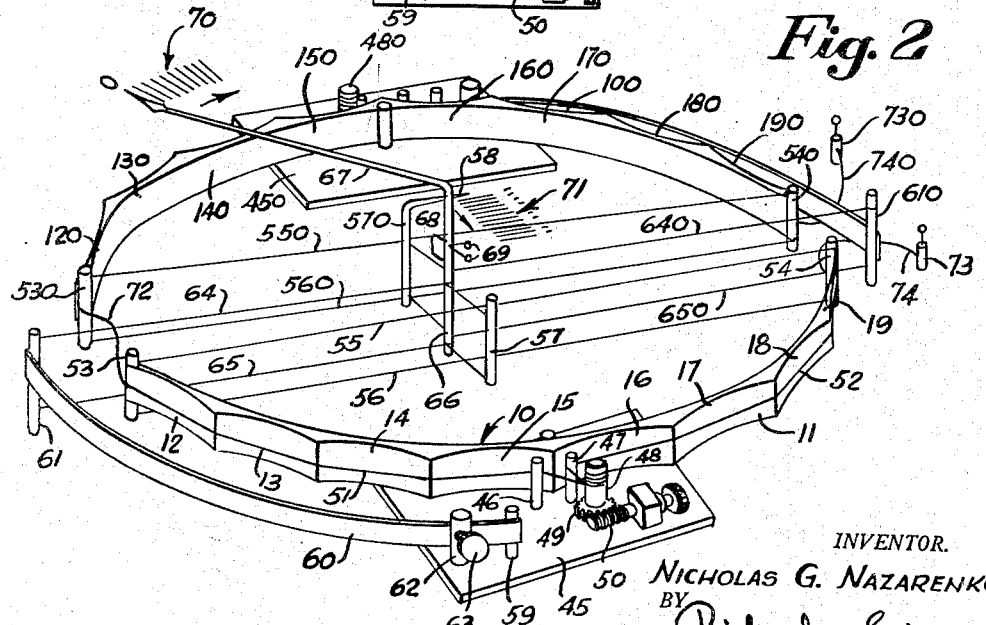
Figure 2 is a perspective diagrammatic view thereof.

The instrument shown in Figures 1 and 2 includes two springs 10 and 100 which are located opposite each other and which are of the same construction.

The springs 10 and 100 are made of a material the temperature coefficient of expansion of which is zero or is a negative quantity, such as quartz, resilient alloys of Invar, Constantane, etc.

Each of the springs 10 and 100 has the form of a flat body bent essentially in the form of a semi-circle.

The spring 10 has an outer surface 11 having the shape of a polygonal body. Thus the spring 10 may be described as consisting of a plurality of plates 12 to 19 joined at an angle which depends upon the length of the plates, their number and the radius of the semi-circle formed by interconnected plates.

The plates 12 to 19 have middle portions 20 to 27 which must be sufficiently thin to enable each plate to be resilient and elastic about its middle portion. At the same time, the end portions 28 to 36 of the plates are made so thick that they are completely rigid; they form ribs 37 to 43 located upon the outer surface 11 of the spring 10.

Thus the spring 10 has a periodically variable transverse section and a periodically changing elasticity which is a maximum at the portions 20 to 27 and is zero at the end portions 28 to 36.

The portion 32 of the spring 10 is connected with a support 44 which is carried by a base 45. Two elongated rollers 46 and 47 are also mounted upon the base 45 and extend parallel to the rib 40 on opposite sides of this rib. A rotary shaft 48 also extends vertically from the base 45 and carries a gear wheel 49 which is keyed thereon. The mounting of the shaft 48 upon the base 45 is of standard construction and is not further illustrated. A worm 50 meshes with the gear wheel 49.

A conducting strip or wire 51 of any suitable resistance and cross-sectional area has one end which is firmly connected with the end 28 of the spring 10. The wire 51 extends around one half of the spring 10. The wire 51 passes over the roller 46 and its other end is firmly connected with the shaft 48 in such manner that the wire 51 may be wound upon the shaft 48.

A similar wire 52 has one end which is attached to the end 36 of the spring 10. The other end of the wire 52 is firmly connected with the shaft 48 and may be wound thereon. The wire 52 passes over the roller 47.

It is apparent that when the worm 50 is actuated to turn the gear wheel 49 and the shaft 48 in one direction, the wires 51 and 52 will be pulled toward the shaft 48 and will open the curved spring 10 in such manner that the distance between its ends 28 and 36 will be increased. As a result of this stretching of the spring 10, the outer surfaces 11 of its plate-like elements 12 to 19, which were originally flat, will become curved inwardly and the sections of the wires 51 and 52 extending between two adjacent ribs will form corresponding secants. It is thus apparent that in horizontal section, the spring 10 and the wires 51 and 52 will form sectors arranged substantially end to end upon a large semi-circle.

It is important that the width of each such sector should be about 1/500 of its length, which is the length of each of the elements 12 to 19.

The spring 100 is situated opposite the spring 10, is of the same construction and is operated in the same manner. Thus the parts 110, 120, 130 . . . 520 of the spring 100 are the same as the parts 11, 12, 13 . . . 52 of the spring 10, the symbol "0" having been added to a numeral describing a part of the spring 10. Therefore, the spring 100 will not be described in greater detail.

The ends 28 and 36 of the spring 10 carry vertical rods 53 and 54. Two wires or springs 55 and 56 are stretched with equal tension one above the other between the rods 53 and 54 (Fig. 2). A vertical rod 57 is connected with the wires 55 and 56 substantially in the middle of these wires. The rod 57 has an upper end extending above the wire 55 and a lower end extending below the wire 56.

The spring 100 has corresponding rods 530 and 540 carrying the ends of wires 550 and 560. A vertical rod 570 is located opposite the rod 57 and is connected with the wires 550 and 560. The rod 570 has an upper horizontally bent portion 58.

A supporting column 59 is mounted upon the base 45 substantially opposite the worm 50. One end of a flat, light, elongated leaf spring 60 of great elasticity is firmly attached to the column 59 above the base 45. The leaf spring 60 extends around the sections 12, 13 and 14 of the spring 10 and carries a rod 61 at its outer end.

Another vertical column 62 which is mounted upon the base 45, is located substantially opposite the rib 39 of the spring 10 and carries a horizontal screw 63 which may engage the spring 60 and shift the position of the free end thereof.

The portions 170, 180 and 190 of the spring 100 are enclosed by a leaf spring 600 which is substantially similar to the spring 60 and is carried by a column 590. A rod 610 on the outer end of the spring 600 is located substantially opposite the rod 61. The tension of the spring 600 may be adjusted by means of the screw 630 carried by the column 620.

It is apparent from Figures 1 and 2 that the rods 61 and 610 are located outside of the curved springs 10 and 100 and substantially opposite the middle of the space between the springs 10 and 100. Two threads 64 and 65 extend between the rods 61 and 570 and have ends which are firmly attached to these rods; the threads 64 and 65 extend around a thin, light pin 66 which is located substantially in the middle of the system formed by the springs 10 and 100.

Corresponding threads 640 and 650 are attached one above the other to the rod 610 of the spring 600 and extend around the central pin 66; the other ends of the threads 640 and 650 are attached to the rod 57.

It is thus apparent that for the most part the threads 64 and 65 extend practically in alinement with the threads 640 and 650 and parallel to the threads 55, 56, 550 and 560. The remaining portion of the threads 64, 65, 640 and 650 extends at right angles thereto, practically in alinement with the remaining portions of threads 640 and 650, respectively.

A pointer 67 is firmly connected to or integral with the upper end of the pin 66. The pin 66 carries the usual damping device 68 and counterweights 69 which are indicated diagrammatically in the drawing. Bearings (not shown) are used to support the pin 66, which may be provided with grooves or ribs to maintain the threads in place.

The pointer 67 moves over a scale 70 which is indicated diagrammatically in Figure 2. Each complete revolution of the pointer 67 may be indicated upon a scale 71 by the pointer 58 constituting a part of the rod 570.

Two ends of the wires 51 and 510 may be joined by a conducting wire or strip 72.

The opposite end of the wire 51 may be connected to a terminal 73 by a wire 74.

Similarly, the opposite end of the wire 510 may be connected to a terminal 730 by a wire 740.

It is apparent that any change in the temperature of the wires or strips 51 and 510 will be followed by a corresponding change in their lengths. This expansion or contraction of the wires may be caused by an electrical current flowing through them or by a change in the temperature of the medium surrounding the wires. For example, if the temperature is increased the length of the wires 51 and 510 will be increased also, and, as a result, the tension of the springs 10 and 100 will be weakened and the opposite ends 53 and 54 of the spring 10 will move toward each other; similarly the ends 530 and 540 of the spring 100 will approach each other.

The operation will be reversed, if the temperature is decreased.

It is apparent that while the ends 53, 54, 530 and 540 of the springs 10 and 100 and the rods 57 and 570 connected therewith by the wires 55, 56 and 550, 560, respectively, are subjected to this variable tension, the rods 57 and 570 are also subjected to substantially non-variable tension by the wires or strings 64, 65 and 640, 650, connected with the springs 60 and 600, respectively. Consequently, the pin 66 will be turned by the movement of the strings 64, 65, 640 and 650 which embrace the pin 66 and extend in opposite directions. This turning of the pin 66 will be indicated upon the scale 70 by the pointer 67 while, as already stated, each complete revolution of the pointer 67 will be indicated by the pointer 58 upon the scale 71.

An advantage of this construction is that due to the fact that the forces acting upon the pin 66 are opposed and thus balance each other, the pin 66 is not subjected to shifting forces which are present in prior art instruments employing heated wires, and which develop substantial friction in the bearings, affecting the accuracy of the instrument. The pin 66 of the present invention, on the other hand, can rotate freely and make several revolutions. Obviously, the scale 70 over which the pointer 67 of the pin 66 is moved, may be located along a spiral section and may have any suitable graduations.

It is further apparent that the precision and sensitivity of the apparatus will be increased by increasing its dimensions and by increasing the number of elements of which the springs 10 and 100 are composed.

The described instrument may be varied in many different ways:

The device shown in Figure 3 consists of a single spring 101 which is similar in construction to spring 10 or 100. A single expansible wire 511 is attached to the ends 531 and 541 of the spring 101 and is held taut by means of a screw 461. This device may be provided with contacts (not shown) and then may be used as a heat relay or the like, which is extremely sensitive to small variations in temperature of the surrounding medium.

The device shown in Figure 4 includes a single spring 102 (similar to those already described) which carries a single expansible wire 512. At the end 542 of the spring 102 the wire 512 is wound upon a shaft 482 which may be operated by a worm (not shown) in a manner similar to that in which the shaft 48 is operated. This arrangement provides a device which is most sensitive to temperature variations.

The device shown in Figure 5 includes a single spring 103 which is held by a support 443 at its end 543. A single expansible wire 513 is stretched around the spring 103 and one of its ends is fixed at 483 at a substantial distance from the end 543 of the spring 103. This arrangement increases the sensitivity of the device to temperature variations.

Another most sensitive device shown in Figure 6 includes a single spring 104 which is held in the middle by a support 444. An expansible wire 514 is attached to the ends 534 and 544 of the spring 104. Another wire 75 is attached at one end to the middle of the wire 514 and at its other end to a support 484. The wire 75 pulls the wire 514 into engagement with rollers 464 and 474.

Yet another device shown in Figure 7 includes two expansible wires 515 and 525 and a single spring 105. The wire 515 is attached to the end 535 of the spring 105; it embraces one half of the spring 105 and is fixed to a screw 485 at a distance from the spring 105. The wire 525 is attached to the end 545 of the spring 105 and embraces the other half of this spring, being fixed to a screw 76 located opposite the screw 485. Thus in plan view the wires 515 and 525 form an elongated letter X. The two screws 485 and 76 are used to regulate the extent of tension of the wires 515 and 525.

In all of the described constructions the conducting wires are insulated from the semi-circular spring which carries them.

It is apparent that the described instruments may be utilized most effectively as thermometers for measuring various temperatures of static liquid or gaseous media, or for measuring the speed of movement of currents or flows of liquids and gases, by means of the convectional cooling or heating of the wires 51, 52, etc., as well as for measuring the speed of movement of bodies carrying these instruments and moving in liquid or gaseous media having a known temperature.

Furthermore, the described devices may be used as the foundation for various electrical instruments, such as milliamperemeters, amperemeters, millivoltmeters, voltmeters, etc., for measuring the amperage or voltage of direct and alternating currents.

In the event the instrument is used as an amperemeter for measuring currents which are larger than 0.5 amperes, it is not necessary to provide it with shunts since the dimensions of the wires or strips 51, 52, etc., may be varied at will, and thus the wires may be so constructed that they will carry any desired current.

Therefore, an important advantage of the described instrument over prior art constructions is that in the described constructions the elasticity of the wire to be heated plays no part.

Figures 8 to 16 show some of the possible applications of the described principles of the present invention to electrical measuring instruments, including electrostatic voltmeters, electrometers and many others.

In the construction shown in Figure 8 the free end of a wire 513 embracing a spring 103 (see Fig. 5) is connected to the movable side of a piezoquartz 77 the sides of which are subjected to static charges and tensions in the usual manner (not shown).

In the construction shown in Figure 9 the piezoquartz 77 is connected to the wire 75 attached to the wire 514 carried by a spring 104 (see Fig. 6).

In the construction of Figure 10 the free end of the wire 513 (see Fig. 5) is connected to the yoke of an electromagnet 78 which is fed through the wire 79 by the current to be measured.

As shown in Figure 11, the yoke of the electromagnet 78 may be connected to the wire 75 of the construction shown in Fig. 6.

In the construction shown in Figure 12, the resilient spring is composed of two sections 106 and 107 connected with the moveable sides of a piezoquartz 79 subjected to a static charge or to a voltage. The sections 106 and 107 carry suitably connected wires 516 and 526.

In the construction shown in Figure 13, the two sections 106 and 107 are connected with a magnetostrictional member 80 of known construction, the length of which changes as a result of magnetization caused by wiring 81 carrying the current to be measured.

In the construction shown in Figure 14, the wires 515 and 525 (see Fig. 7) are connected by means of terminals 87 and 82 to opposite ends of a piezoquartz 83 changing its length as a result of static charges or voltage.

In the construction shown in Figure 15, the wire 75 (see Fig. 6) is connected to the moveable electrode of a static condenser 84 having air as its dielectric and a resilient support (not shown), the other electrode of the condenser 84 being fixed.

In the construction shown in Figure 16, the wires 515 and 525 (see Fig. 7) are connected to the ends of a magnetostrictional member 85 which changes its length upon being magnetized by the current to be measured passed through a wiring 86 enclosing the member 85.

The construction shown in Figure 17, includes a thin band 90 consisting of a material having a large coefficient of expansion, such as an alloy of platinum and iridium or the like, coated with a light absorbing material, such as carbon black, sponge platinum and the like. The band 90 is located in a heat-insulated space and is subjected to heat or light passed through a special opening (not shown). Then the device may be used for measuring different radiation, and as white or colored light, radiation heat etc. Obviously the band 90 may be used in conjunction with any other illustrated device.

It is apparent that many other constructions may be produced, which consist of various combinations of the elements constructed in accordance with the present invention with many prior art devices. All such variations and modifications are to be included within the scope of the present invention.

What is claimed is:

1. In a measuring instrument, in combination, a member consisting of a plurality of substantially triangular rigid portions and resilient strips joining said portions, each of said strips extending at substantially the same angle to an adjacent strip, whereby said member has the form of a polygonal open body; and whereby ribs are formed upon an outer surface of said member, expansible and contractable elements connected with opposite ends of said member and extending along said ribs, said elements expanding and contracting in response to changes in their temperature, a rotary shaft located substantially opposite the center of said member and carrying the ends of said elements, whereby the turning of said shaft in one direction pulls said elements to stress said member, and whereby variations of the form of said member indicate the expansion and contraction of said elements, and means connected with said shaft for selectively turning the same.

2. In a measuring instrument, in combination, a member consisting of a plurality of substantially triangular rigid portions and resilient strips joining said portions, each of said strips extending at susbtantially the same angle to an adjacent strip, whereby said member has the form of a polygonal open body, expansible and contractible means connected with opposite ends of said member and pulling said member in one direction, said means expanding and contracting in response to changes in its temperature, at least one substantially non-expansible and non-contractable elongated element connected with opposite ends of said member and pulling said member in the opposite direction, a spring, means operatively connecting said spring with said non-expansible and non-contractable elongated element to subject said element to a continuous stress, and an indicator connected with the last-mentioned means.

3. In a measuring instrument, in combination, two members located opposite each other, each of said members consisting of a plurality of substantially triangular rigid portions and resilient strips joining said portions, each of said strips extending at substantially the same angle to an adjacent strip, whereby said member has the form of a polygonal open body, expansible and contractible means connected with opposite ends of one member and pulling the member in one direction, expansible and contractable means connected with the opposite ends of the other member and pulling it in the opposite direction, each said means being expansible and contractable in response to changes in its temperature, substantially non-expansible and non-contractable elongated elements connected with opposite ends of each member and pulling each member in directions opposite to those of said means, two springs, each of said springs being located adjacent a separate member, means connecting one of said springs to that element which is connected with the opposed member to subject said element to a continuous stress, means connecting the other one of said springs to the other element to subject it to continuous stress, and an indicator connected with the two last-mentioned means.

4. In a measuring instrument, in combination, two members located opposite each other, each of said members consisting of a plurality of substantially triangular rigid portions and resilient strips joining said portions, each of said strips extending at substantially the same angle to an adjacent strip, whereby said member has the form of a polygonal open body, expansible and contractible means connected with opposite ends of one member and pulling the member in one direction, expansible and contractable means connected with the opposite ends of the other member and pulling it in the opposite direction, each said means being expansible and contractable in response to changes in its temperature, substantially non-expansible and non-contractable elongated elements connected with opposite ends of each member and pulling each member in directions opposite to those of said means, two springs, each of said springs being located adjacent a separate member, a separate rod connected with each element substantially in the middle of the element, an indicator pin located between said rods, at least two other non-expansible and non-contractable elongated elements, each of the last-mentioned elements having an end connected to a separate spring to subject said element to a continuous stress and another end connected to that rod which is associated with an opposed member, the last mentioned elements embracing said indicator pin, and a pointer connected with said indicator pin.

5. A measuring instrument, comprising, in combination, a member consisting of a plurality of substantially triangular rigid portions and resilient strips joining said portions, each of said strips extending at substantially the same angle to an adjacent strip, whereby said member has the form of a section of a polygonal body, and whereby ribs are formed upon an outer surface of said member, said member having a fixed portion and at least one free end, expansible and contractible wire means connected to a free end of said polygonal body section and extending along said ribs, means connected with said wire means for tensioning said wire means and thereby exerting a stress upon said member, other wire means connected to one end of said polygonal body section and extending substantially in the direction of the center of the polygonal body, means connected with said wire means for exerting a substantially constant tensioning force thereon in said direction, and an indicator device operatively connected with the last-mentioned means.

References Cited in the file of this patent

UNITED STATES PATENTS

| Number | Name | Date |
|---|---|---|
| 19,177 | Young | Jan. 9, 1858 |
| 317,990 | Graves | May 19, 1885 |
| 847,543 | Batault | Mar. 19, 1907 |

FOREIGN PATENTS

| Number | Country | Date |
|---|---|---|
| 20,085 | Great Britain | 1913 |